Feb. 25, 1936.  E. J. GRAF  2,031,641

ILLUMINATED DECORATIVE DEVICE

Filed April 24, 1933  2 Sheets-Sheet 1

INVENTOR
ELMER J. GRAF
BY
A. D. T. Libby
ATTORNEY

Feb. 25, 1936.  E. J. GRAF  2,031,641
ILLUMINATED DECORATIVE DEVICE
Filed April 24, 1933   2 Sheets-Sheet 2
FIG. 16.   FIG. 17.   FIG. 18.  FIG. 19.
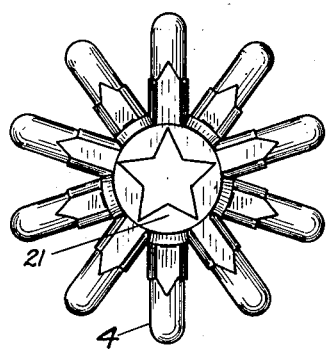 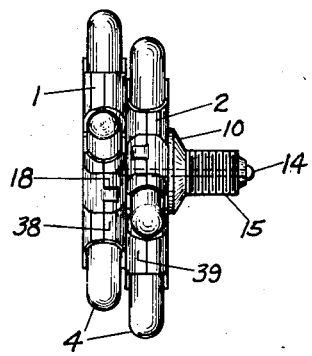 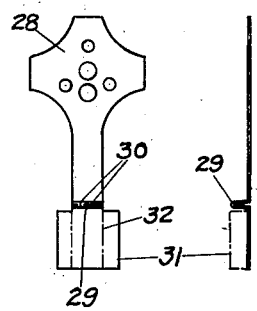
FIG. 20.   FIG. 21.   FIG. 22.
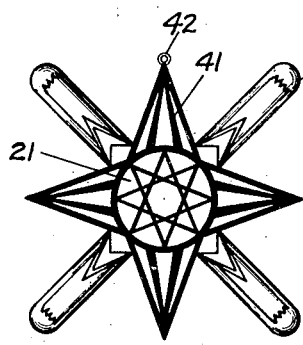 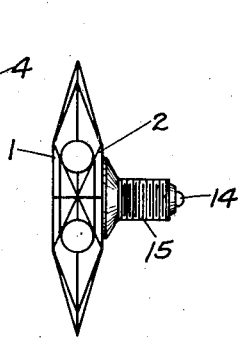 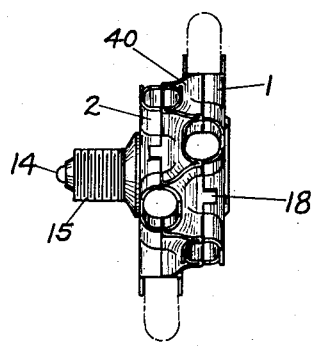
FIG. 23.   FIG. 24.   FIG. 25.
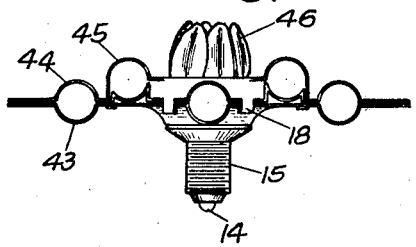 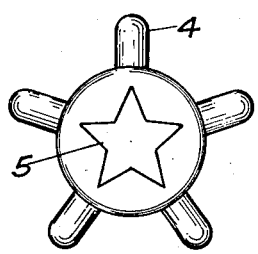 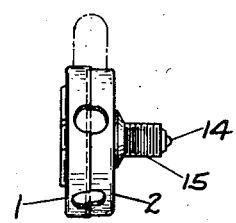
INVENTOR
ELMER J. GRAF
BY
W. D. T. Libby
ATTORNEY Patented Feb. 25, 1936

2,031,641

UNITED STATES PATENT OFFICE 2,031,641

ILLUMINATED DECORATIVE DEVICE

Elmer J. Graf, Roselle Park, N. J., assignor to G. B. G. Corporation, Newark, N. J., a corporation of New Jersey Application April 24, 1933, Serial No. 667,567

14 Claims. (Cl. 240—10)

This invention relates to an illuminated device especially designed for decorative purposes, and more particularly for Christmas decorations, such as on Christmas trees and window displays.

For Christmas tree decorations, it has been the custom in the past, so far as I am aware, to trim the trees with festoons composed of lamp sockets and bulbs connected in series, the whole series being then connected by a suitable connector into a standard lighting socket, usually provided with a source of current having a pressure of 110 volts. With this style of tree lighting, the decorative effects are rather limited, being dependent somewhat on the shape of the bulb itself and the coloring thereof.

I have found by experience that the most economical way of making such decorative units is to make them of sheet material preferably metal, which can be readily stamped or pressed into the desired form, means being provided on the cooperating parts for locking them together without the necessity of providing separate assembly means. By using a material which can be stamped, the same may be embossed or pierced to give desired artistic effects so that the light from the interiorly mounted bulb or bulbs may shine out through the various parts of the device. The stamped units can be made of relatively thin material and yet be strong, and this, together with the small tubular bulbs or light-transmitting members, gives the great advantage of extremely light weight to the units, so that when the devices are hung on a Christmas tree, the limbs will bend but very little. Generally speaking, my invention relates to a stamped or pressed holder having tubular extensions for securely carrying tubular-shaped light-transmitting members of glass.

My invention is directed to an improved form of decorative lighting wherein the lamp bulbs are assembled as a unitary structure which may be connected into a socket or receptacle connected in parallel across supply wires which in turn are adapted to be connected through a suitable connector to the house lighting circuit.

Another object of my invention is to provide a mechanical structure which of itself is highly decorative and ornamental in its design, which ornamental effect may be heightened by using lamp bulbs of different colors.

Another object of my invention is to provide an illuminated decorative device which can be made cheaply, yet one which is relatively rugged, and therefore one that will stand considerable hard use without substantial detriment.

These and other objects will be apparent to one familiar with such devices on reading of the specification taken in connection with the annexed drawings, wherein:

Figure 16 is a front or plan view of a double-deck or combination device.

Figure 17 is a side elevation of Figure 16.

Figure 18 is a plan view of a type of insulator which may be used in the crucifix form of device shown in Figures 10 and 11.

Figure 19 is a side view of Figure 18.

Figure 20 is a still further modified form of casing.

Figure 21 is a side view of Figure 20, but without the bulbs in position.

Figure 22 is a view similar to Figure 17, but showing a three instead of a four-part casing, with only two lamp bulbs being indicated.

Figure 23 shows a still further modified form of device using a three-part casing.

Figure 24 is a front or plan view of a further modified form of the device shown in Figure 25.

Figure 25 is a side elevation of the device shown in Figure 24, only one lamp bulb being indicated.

Figure 1:
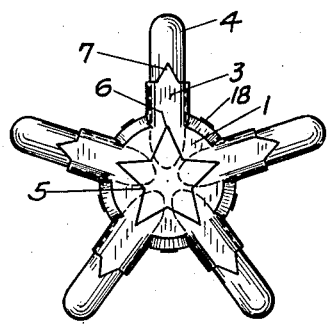
Figure 1 is a front view of one form of my invention.

Referring to the details wherein like numbers refer to corresponding parts in the various views, and referring first to the form of device shown in Figures 1 to 5 inclusive, the casing comprises two metallic star-shaped pieces 1 and 2 which are very similar in construction. The pieces 1 and 2 have a central portion from which radiate arms 3 forming the points of the start, and these arms are formed somewhat arcuately in shape to provide complementary recesses which form sockets for baseless lamps 4.

The central portion of the member 1 of the casing may have the metal punched or formed outwardly into a decorative design, such as the star 5, and preferably the points 6 of the star 5 extend toward the arms 3 of the casing. To carry out the star-point effect, the arms 3 are also preferably provided with points 7 to correspond to the points 6, thereby providing a very artistic effect to the front of the device.

Figure 2:
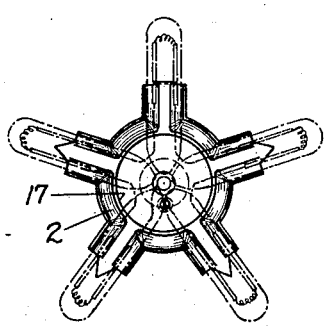
Figure 2 is a view similar to Figure 1, but with one of the parts comprising the casing removed.

The central portion of the back member 2 of the casing is provided with a plurality of holes 8 to receive studs 9 on the flange portion 10 of the insulator 11, thereby positively positioning the insulator 11 on the central portion of the casing member 2. Holes 12 and 13 are also provided; the first to pass a central contact 14, while the hole 13 is to pass a wire extending from the screw-thimble 15 through the orifice 16 in the flange of the insulator 11. The inner end of the pin 14 is riveted over a small washer fitting over the pin 14 and against a suitable insulator 17, as shown in Figure 2, while the wire passing from the connector thimble 15 through the holes 16 and 13, and corresponding hole in the insulator 17, is fastened by soldering directly to one of the lead wires coming from one of the lamp bulbs 4.

The five lamp bulbs 4 are connected in series, the last connection being fastened to the end of the pin 14. The central portion of the casing member 1 is also provided with a disc-shaped washer similar to 17, but without any holes, so as to prevent the connections between the lamp bulbs from contacting with the parts of the metal casing which form a holder for the lamp bulbs 4.

Figure 3:
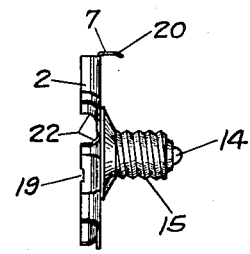
Figure 3 is a side elevation of the back part of the casing, showing one form of connector to fit a screw-type socket.
Figure 4:
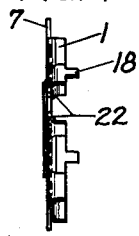
Figure 4 is a side elevation of the front or casing member 1 of Figure 1.

The parts 1 and 2 of the metal casing forming the holder, are fastened together in any satisfactory manner as by clips 18 which may be on either of the parts 1 or 2, but as indicated are shown on the part 1 (see Fig. 4). These clips are adapted to be bent over and lie in notches 19, the inner ends being turned downwardly over the sloping portion of the casing member 2, thereby interlocking the two casing members 1 and 2. It may be mentioned that one of the points 7 on either of the casing parts 1 or 2 may be bent over as indicated in Figure 3, and provided with a small hole 20 through which a wire may be passed for supporting the entire device.

In certain cases I may completely punch out the central portion of the front casing member 1 and fit therein a member 21 preferably of colored cellulose material which will transmit light therethrough, so that a certain amount of light from the bulbs 4 will light up this star-shaped or other ornamental member 21, thereby further enhancing the ornamental effect of the device. It will be noted from Figures 1 and 2 that the lamp bulbs 4 are so positioned in the holder that they extend as closely as possible to the axial center of the device in order to get as much light as possible for illuminating the member 21.

Figures 14, 15:
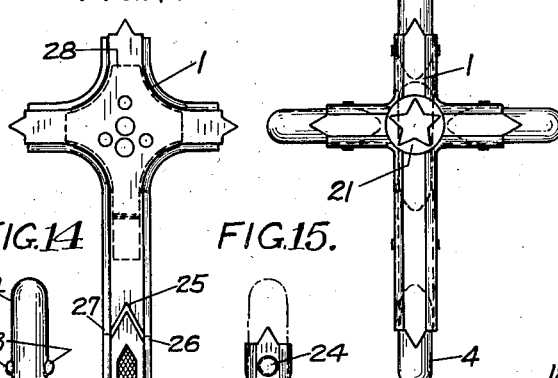
Figure 14 shows a baseless lamp bulb of a type which may be used in my decorative device.
Figure 15 is a fragmentary view of a part of one of the casing members showing the lamp bulb of Figure 14 mounted therein.

It is also to be noted that the arms 3 are not completely semi-circular, but are preferably provided with slight troughs 22 which will hold a certain amount of cement which may be used to anchor the lamp bulbs 4 within their respective sockets. However, the bulbs 4 may be provided with slight projections 23 which will fit into openings or holes 24 punched in the arms 3, whereby the bulbs 4 will be securely anchored in the holders without the use of any cement. Other means of anchoring the bulbs 4 in the holder may be used. By the construction shown in Figures 14 and 15, tiny spots of light will be seen in the arms 3, which also add to the attractive decorative effect of the device.

Figure 10:
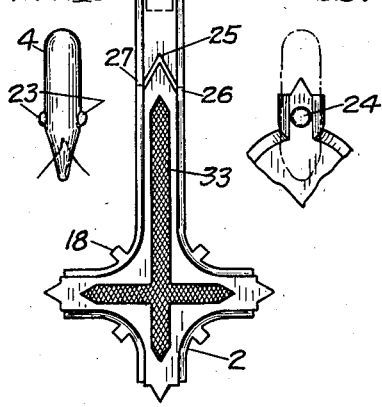
Figure 10 is a plan view of a casing having two portions which are attached together as will be later explained, whereby the two pieces may be bent toward each other to form a casing in the shape of a crucifix.

In the form of device shown in Figure 10, the two portions 1 and 2 of the metallic casing are partially separated by a V-shaped slot 25 punched in the metal when it is being punched out from the blank. The upturned sides 26 are left complete and the two parts 1 and 2 are then bent toward each other on the line 27, it being understood that before the parts are bent together they are provided with suitable insulators 28 as shown in Figures 18 and 19. From these figures, it is seen that the insulator 28 is folded up at 29, and the fold 29 has two small slits 30 therein to receive terminal wires from one of the baseless bulbs 4. The insulator 28 also has the sides 31 turned up on the line 32 to assist in positioning the bulb used in the long arm of the crucifix, it being understood that when the parts 1 and 2 of Figure 10 are folded toward each other, the slot 25 provides an opening through which the bulb in this long arm of the crucifix will extend, and the slits 30 are to receive the wires coming from this bulb. The portion 2 of the casing may have a crucifix design 33 formed therein, similar to the star 5 of Figure 1, or the part 33 may preferably be of light-transmitting material, such as the member 21, and the fifth bulb 4 is placed directly beneath the crucifix design 33.

Figure 11:
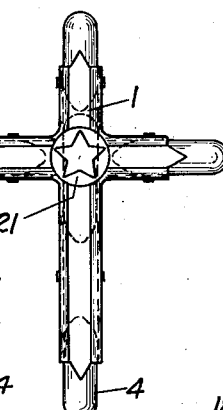
Figure 11 is a view of a crucifix form of casing made in two separable parts.

In the form of device shown in Figure 11, the parts 1 and 2 of the casing are made similar to the parts shown in Figures 1 and 2, but in the crucifix form, similar to Figure 10, the fifth bulb is indicated below the star-shaped member 21.

Figure 12:
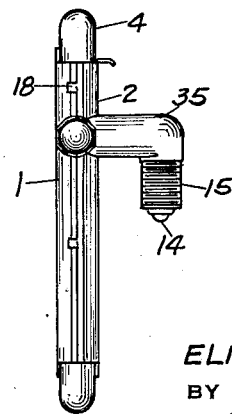
Figure 12 shows a crucifix type of device having an L-shaped type of connector.

In Figure 12, the connector parts 14 and 15 are joined to the holder by an L-shaped bracket 35 which may be of insulating material fastened to the member 1 in any satisfactory manner.

Figure 13:
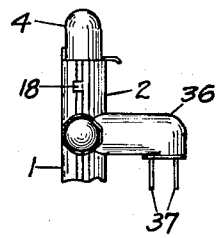
Figure 13 is a view similar to Figure 12, but showing a plug-in type of connector.

In Figure 13, the insulator 36 is provided with plug-in members 37.

The forms shown in Figures 12 and 13 are adapted for use for special mountings.

Figure 5:
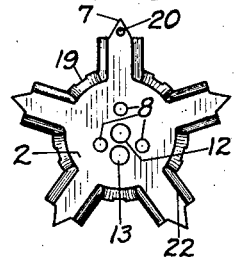
Figure 5 is a plan view of the back part of the casing with the connector removed.
Figure 6:
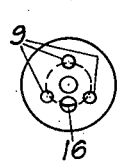
Figure 6 is a view of the left-hand end of Figure 7.
Figure 7:
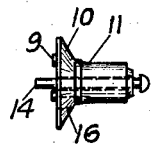
Figure 7 is a side elevation of the insulator used in the construction of the connector shown in Figure 3. The central connecting pin is also shown.
Figures 8, 9:
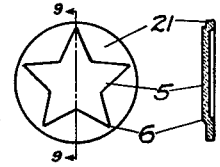
Figure 8 is a plan view of a transparent or semi-transparent member which may be used in the lamp bulb holder to transmit light from the central part thereof.
Figure 9 is a section on the line 9—9 of Figure 8.

In Figures 16 and 17, there is shown what may be termed a double-deck or combination device in which the same back and front pieces 1 and 2 are used as in Figures 1 and 2, while the two intermediate casing pieces 38 and 39 may be exactly the same as the casing member 2, the holes therein, as shown in Figure 5, being utilized to pass the connecting wires therethrough, while the pin 14 is made longer and fastened to the member 33, just as it is fastened to the member 2 in Figure 2. As will be seen, the two sections are staggered arcuately to provide a symmetrical arrangement as shown in Figure 16. The member 1 may be constructed as shown in Figure 1, or may carry the light-transmitting member 21 of Figure 8.

In Figure 22, the construction is somewhat similar to that shown in Figure 17, except that a special intermediate member 40 is used. The member 40 is formed with alternately complementary recesses to cooperate with the corresponding socket recesses in the members 1 and 2. The three parts 1, 2, and 40, of the casing are fastened together in a similar manner as the parts in Figure 17.

In the devices shown in Figures 20 and 21, the two parts of the casing, 1 and 2, are made in a fanciful star-shaped form having radiating lines 41 extending from the central part of the holder, the front of which is covered with a specially-shaped device or light-transmitting member 21. In this form of device, only four bulbs are used, the filament being arranged to equally divide the voltage of the current supply. An eyelet 42 is provided for assisting in supporting this device.

In Figure 23, I have shown a three-part casing, the parts, however, being different from those shown in Figure 22. These parts are numbered 43, 44, and 45, and are interlocked in a manner similar to the parts 1 and 2 previously described. In this form, the same as in Figures 17 and 22, it will be seen that the lamp bulbs are arranged alternately in different planes, but preferably spaced symmetrically as shown in Figure 16. The ornamental effect is further enhanced by a cusp 46 formed or attached to the outer casing member 45.

In Figures 24 and 25, I have provided a two-part casing member in which the two parts 1 and 2 are made in the shape of a circular casing, like a can, whereby the two parts overlap each other and are fastened together either by a press-fit, soldering, or otherwise. Preferably the outer part or cover 2 has an embossed star 5 or other figure therein to give it an ornamental effect. In this form of device, after the lamp bulbs 4 are connected and laid into the casing member 2 and connected to the connector parts 14 and 15, the casing member may be poured full of a high temperature melting compound, and likewise the cover part 2 may be filled or partially filled with it, and then the whole assembled, so the device will be practically moisture-proof, in which case it may be used out of doors for any desired lighting effect.

From what has been said, it will be seen that the mechanical details entering into the construction of my improved form of decorative device may be varied, but the claims are intended to cover all the variations which come within the scope of my invention.

Having thus described my invention, what I claim is:

1. An illuminated decorative device including a plural part stamped casing having portions fitting and fastened together to form a holder, said portions of the holder having central body portions and complementary extensions arcuately formed to provide sockets for baseless lamp bulbs, baseless lamp bulbs anchored in said sockets against turning and withdrawal, and positioned therein so as to throw light within the body portion as well as outside said extensions, a current supply connector attached to one of said holder portions, said bulbs being connected in series with the electrical parts of said connector, said central body portion being provided with means for emanating light therefrom.

2. An illuminated decorative device as set forth in claim 1, further characterized in that one side of the central part of the holder is provided with a light-transmitting member for the purpose described, the inner ends of the bulbs extending closely to the axis of the holder to overlap said light-transmitting member for the purpose described.

3. An illuminated decorative device as set forth in claim 1, further characterized in that one side of the central part of the holder is constructed so light will pass outwardly therefrom, the inner ends of the bulbs extending closely to the axis of the holder so as to insure that light will be passed from the central part.

4. An illuminated decorative device as set forth in claim 1, further characterized in that the connector includes an insulator having a stem and flange with parts on the face of the flange for co-acting with cooperative parts on said holder portion to prevent the insulator from turning, a pin centrally located and extending through said insulator, and a contact screw shell carried on the stem of the insulator, said pin and shell being connected to opposite ends of the lamps which are connected in series.

5. An illuminated decorative device as set forth in claim 1, further characterized in that two sets of said pieces are used, the sets being positioned in different planes and in staggered relation so the bulbs are symmetrically spaced arcuately around the axial center of the device.

6. An illuminated decorative device as set forth in claim 1, further characterized in that three pieces are used to provide the sockets alternately arranged in different planes around the axial center of the device.

7. An illuminated decorative device as set forth in claim 1, further characterized in that three pieces are used to provide the sockets alternately arranged in different planes around the axial center of the device, the center one of said pieces having half-sockets formed therein alternately in opposite direction, while the outer pieces are of substantially the same shape with half-sockets formed therein to cooperate with the central piece.

8. An illuminated decorative device as set forth in claim 1, further characterized in that three pieces are used to provide the sockets alternately arranged in different planes around the axial center of the device, and a centrally arranged ornamental husk carried on the piece opposite to the piece carrying the connector.

9. An illuminated decorative device including a two-part stamped casing forming a holder having a plurality of openings spaced around the outer peripheral edge thereof, lamp bulbs anchored against turning and withdrawal within the holder and extending, one each, through said openings, means connected to a part of the holder for conveying current to said lamps which are preferably connected in series, said means including an insulator held to the holder part by a pin passing through the insulator and into the interior of the holder and anchored therewithin but insulated therefrom and connected to one end of the lamp series, said insulator carrying a metallic, screw-threaded thimble which is electrically connected to the opposite end of the lamp bulb series.

10. An illuminated decorative device including a stamped casing having two portions, each in the form of a crucifix, means for holding said portions together, baseless lamp bulbs held within the casing of the crucifix and extending from the arms thereof, one portion carrying a current connector for conveying current to said bulbs, said device being further characterized in that said two portions of the casing are made in one piece and have a formation so the pieces can be folded at the center to form the casing and provide a socket for one of the lamp bulbs.

11. An illuminated decorative device including a casing composed of a plurality of preformed stamped star-shaped pieces having complementary recesses therein forming sockets at the points of the star, means for fastening said pieces together, series connected tubular lamp bulbs positioned and anchored in and extending from said sockets, and a current connector carried by one of said casing pieces for carrying current to said bulbs, said connecting means including a flanged insulator carrying a pin, said flange having studs for locating the flanged insulator on said casing piece, a disc insulator within the casing fitting over the end of said pin and being fastened thereto, the inner end of said pin being electrically connected to a terminal of one of said lamp bulb series, a metallic thimble carried by said flanged insulator and electrically connected to a terminal of a bulb at the end of the series.

12. A unitary illuminated decorative device of the character described including a plural-part stamped casing, each part having a central portion from which pointed extensions project in symmetrical relation, means for interlocking said parts together, said extensions being arcuately formed to provide sockets, tubular baseless lamps held in said sockets and connected in series, and a current supply connector carried by one part of said casing and having its current-carrying members connected in series with said bulbs, said connector including a cylindrically shaped insulator having a flange engaging one part of the casing and a pin going through the insulator and fastened to but insulated from the interior of the casing and electrically joined to one end of the bulb series, and a metallic member carried on the exterior of said cylindrically shaped insulator and electrically connected to the other end of the bulb series.

13. A unitary decorative device as set forth in claim 1, further characterized in that the sockets and lamps are alternately arranged in different transverse substantially parallel planes.

14. A unitary decorative device especially adapted for Christmas tree use including a plural-part stamped casing having an apertured holder portion with complementary tubular sockets extending therefrom and also having cooperative locking parts, a threaded connecting stem extending from one side of the holder portion of the casing whereby the casing as a unit may be screwed into a current supply socket and at least one light-emitting member carried by said casing so as to throw light outwardly from said sockets as well as from the holder portion of the casing.

ELMER J. GRAF.